United States Patent
Brown, deceased et al.

[11] 3,897,561
[45] July 29, 1975

[54] N-ALKYLTHIO-N-ALKYL ARYL CARBAMATES AS INSECTICIDES

[75] Inventors: Melancthon S. Brown, deceased, late of Berkeley, Calif., by Gustave K. Kohn, special administrator, Berkeley, Calif.

[73] Assignee: Chevron Research Company, San Francisco, Calif.

[22] Filed: Sept. 5, 1974

[21] Appl. No.: 498,507

Related U.S. Application Data

[60] Continuation-in-part of Ser. No. 306,657, Nov. 15, 1972, Pat. No. 3,845,101, which is a continuation-in-part of Ser. No. 230,117, Feb. 28, 1972, Pat. No. 3,792,169, which is a division of Ser. No. 855,421, Sept. 4, 1969, Pat. No. 3,663,594, which is a continuation-in-part of Ser. No. 764,299, Oct. 1, 1968, abandoned.

[52] U.S. Cl. ................................................ 424/300
[51] Int. Cl. .......................... A01n 9/12; A01n 9/20
[58] Field of Search .................. 424/300; 260/479 C

[56] References Cited
UNITED STATES PATENTS
3,344,153  9/1967  Kuhle et al. .................... 260/347.2

*Primary Examiner*—Jerome D. Goldberg
*Assistant Examiner*—Allen J. Robinson
*Attorney, Agent, or Firm*—G. F. Magdeburger; Dix A. Newell; Raymond Owyang

[57] ABSTRACT

Insecticidal carbamates of the formula

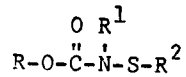

wherein R is phenyl or 1-naphthyl substituted with up to 3 (0 to 3) substituents selected from chlorine, bromine, alkyl of 1 to 6 carbon atoms, alkoxy of 1 to 3 carbon atoms, and alkylthio of 1 to 3 carbon atoms, $R^1$ is alkyl of 1 to 6 carbon atoms, and $R^2$ is alkyl of 1 to 10 carbon atoms.

12 Claims, No Drawings

N-ALKYLTHIO-N-ALKYL ARYL CARBAMATES AS INSECTICIDES

CROSS REFERENCE TO RELATED APPLICATIONS

This application is a continuation-in-part of application Ser. No. 306,657, filed Nov. 15, 1972, now U.S. Pat. No. 3,845,101 which in turn is a continuation-in-part of application Ser. No. 230,117, filed Feb. 28, 1972, now U.S. Pat. No. 3,792,169, which is a division of application Ser. No. 855,421, filed Sept. 4, 1969, now U.S. Pat. No. 3,663,594, which in turn is a continuation-in-part of application Ser. No. 764,299, filed Oct. 1, 1968, now abandoned.

FIELD OF INVENTION

This invention is directed to novel aryl carbamates and their use as insecticides. More particularly, it is directed to a group of novel carbamates in which a proton of the nitrogen atom of the carbamyl group is replaced with an organic moiety derived from a sulfenyl halide.

DESCRIPTION OF INVENTION

The unique carbamates of this invention are represented by the formula:

wherein R is phenyl or 1-naphthyl substituted with up to 3 (0 to 3) groups selected from chlorine, bromine, alkyl of 1 to 6 carbon atoms alkoxy of 1 to 3 carbon atoms and alkylthio of 1 to 3 carbon atoms, $R^1$ is alkyl of 1 to 6 carbon atoms and $R^2$ is alkyl of 1 to 10 carbon atoms.

Examples of radicals which R may represent are phenyl, 2-n-propylphenyl, 2-isopropylphenyl, 2-sec-butylphenyl, 2-tert-butylphenyl, 3-methyl-5-sec-butylphenyl, 3-propyl-5-sec-amylphenyl, 3-amylphenyl, 3-hexylphenyl, 4-tolyl, 3-tolyl, 3-methyl-5-hexylphenyl, 3,5-xylyl, 4-ethylphenyl, 4-cumyl, 2,4-dichlorophenyl, 2,4,6-trichlorophenyl, 4-bromophenyl, 3,5-dibromophenyl, 2-chloro-5-tert-butylphenyl, 1-naphthyl, 2-chloro-5-sec-amylphenyl, 4-methylthio-3-tolyl, 3-propylthiophenyl, 2-isopropoxyphenyl, 3,5-di(methylthio)phenyl, 2-ethoxyphenyl, 4-methoxyphenyl, 2-isopropoxy-3,5-dichlorophenyl, 4-methylthio-3,5-xylyl, 5-methoxynaphthyl, 2,4-dichloronaphthyl, 4-propylthiophenyl and 5-bromonaphthyl. The preferred R groups are 1-naphthyl and phenyl substituted with alkyl of 3 to 6 carbon atoms, especially in the meta or ortho positions.

The alkyl groups which $R^1$ may represent include methyl, ethyl, isopropyl, n-propyl, butyl, isobutyl, amyl and hexyl. The preferred $R^1$ group is methyl.

$R^2$ in the above formula may represent methyl, ethyl, propyl, butyl, sec-butyl, amyl, hexyl, heptyl, decyl, etc. The preferred $R^2$ groups are alkyl of 1 to 4 carbon atoms, especially n-alkyl, i.e., methyl, ethyl, n-propyl and n-butyl.

Representative carbamates of the above formula are: N-butyl-N-methylthiophenyl carbamate, N-isopropylthio-N-methylphenyl carbamate, N-amylthio-N-butyl-2-isopropylphenyl carbamate, N-ethyl-N-octylthio-2-sec-amylphenyl carbamate, N-methyl-N-decylthio-4-tolyl carbamate, N-methyl-N-isopropylthio-2-sec-amylphenyl carbamate N-butyl-N-amylthio-3,5-xylyl carbamate, N-methylthio-N-methyl-2,4-dichlorophenyl carbamate, N-hexylthio-N-hexyl-2,4,5-trichlorophenyl carbamate, N-ethylthio-N-methyl-4-bromophenyl carbamate, N-methylthio-N-methyl-2-chloro-3-isopropylphenyl carbamate, N-octylthio-N-propyl-3-amyl-4-chlorophenyl carbamate, N-decylthio-N-methyl-4-methylthiophenyl carbamate, N-methylthio-N-propyl-3,5-xylyl carbamate, N-ethylthio-N-methyl-2-chlorophenyl carbamate, N-ethyl-N-isopropylthiophenyl carbamate, N-methylthio-N-methylphenyl carbamate, N-methyl-N-ethylthio-1-naphthyl carbamate, N-methylthio-N-methyl-1-naphthyl carbamate, N-phenylthio-N-propyl-4-tolyl carbamate, N-butyl-N-phenylthio-3-isopropylphenyl carbamate, N-ethyl-N-phenylthio-3,5-xylyl carbamate, N-methyl-N-phenylthio-2,4-dibromophenyl carbamate, N-ethyl-N-methylthio-4-bromophenyl carbamate, N-ethylthio-N-methyl-2-isopropoxyphenyl carbamate, N-methyl-N-ethylthio-3-methyl-4-methylthiophenyl carbamate, N-methylthio-N-propyl-4-ethylthio-3-tolyl carbamate, N-methyl-N-ethylthio-2,4-dichloro-1-naphthyl carbamate, and N-butylthio-N-methyl-1-naphthyl carbamate.

The carbamates of this invention may be made be reacting an aryl carbamate with a sulfenyl halide. The reaction proceeds according to the equation:

wherein X is halogen of atomic number 17 to 35, M is hydrogen or an alkali metal cation and R, $R^1$ and $R^2$ are as defined previously. This reaction may be carried out in pyridine, dimethylformamide with or without an acid acceptor or other solvents such as methylene chloride, chloroform, acetonitrile and dimethoxyethane using an acid acceptor. Acid acceptors which may be used include pyridine, alkylpyridines, quinoline and similar heterocyclic bases. Pyridine is a preferred acid acceptor. When pyridine is used alone it acts both as a diluent and acid acceptor.

In a preferred modification, the reaction is conducted in the presence of minor amounts of stabilizers such as nitrobenzenes, trialkylphosphates or sterically hindered phenols.

The pressures and temperatures at which this reaction may be carried out are not critical. Temperatures ranging from ambient to about 60°C will normally be used. However, lower temperatures or higher temperatures up to the decomposition temperature of the reactants and product may be used. For convenience, the pressure will usually be atmospheric or autogenous. However, subatmospheric or higher superatmospheric pressures may be used. The reaction will normally be complete within about 1 to 4 hours.

The carbamate reactant in the above equation may, and usually will, represent a commercial carbamate insecticide. Conventional methods for preparing such carbamates either in situ or beforehand may be used. Such reactants are disclosed in U.S. Pat. Nos. 3,062,707; 3,062,864; 3,062,865; 2,903,478; 3,084,096; 3,203,853; 3,167,472 and 3,256,145, British Pat. No. 982,235 and Pesticide Index, 3rd edition, D.E.H. Frear (1965).

EXAMPLES

The following examples illustrate methods which may be used to prepare the carbamates of this invention. These examples are in no way intended to limit the invention described herein.

Other carbamates of this invention were made by the general technique described in Examples 1–5. These carbamates along with their elemental analysis are reported in Table I. In addition to elemental analysis, the carbamates were also characterized by infrared and/or nuclear magnetic resonance spectroscopy.

EXAMPLE 1 —
N-Methylthio-N-methyl-2,4-dichlorophenyl carbamate

A solution of 3.7 g. methylsulfenyl chloride was added dropwise to a mixture of 9.93 g. N-methyl-2,4-dichlorophenyl carbamate, 3.57 g. pyridine and 70 ml. methylene dichloride at about 25°C. The reaction mixture was stirred for 1 hour and allowed to stand overnight at about 25°C. The reaction mixture was then diluted with 200 ml. methylene dichloride, washed with water, dried over magnesium sulfate and evaporated under reduced pressure to give mixture of an oil and the starting carbamate (3.5 g.). The oil was chromatographed on silica gel (hexane/methylene dichloride eluants) to give 5.9 g. of the product as a yellow oil. The structure of the product was confirmed by infrared and nuclear magnetic resonance spectroscopy. The elemental analysis is tabulated in Table I.

EXAMPLE 2 —
N-Ethylthio-N-methyl-m-sec-butylphenyl carbamate

A solution of 4.34 g. ethylsulfenyl chloride was added dropwise to a solution of 9.3 g. N-methyl-m-sec-butylphenyl carbamate, 3.75 g. pyridine and 100 ml. methylene dichloride at about 0°C. The reaction mixture was allowed to stand at 25°C for about 2 days, diluted with 100 ml. methylene dichloride, washed with water, dried over magnesium sulfate and evaporated under reduced pressure to give an orange oil. The oil was chromatographed on silica gel (hexane/methylene dichloride eluants) to give 3.67 g. of the product. The elemental analysis on the product is tabulated in Table I.

EXAMPLE 3 —
N-Methyl-N-butylthio-1-naphthyl carbamate oil. 4

A solution of 7.12 g. butylsulfenyl chloride was added dropwise to a solution of 10.4 g. N-methyl-1-naphthyl carbamate, 8.24 g. pyridine, 10 drops triethylphosphate and 125 ml. methylene dichloride at about 25°C. The reaction mixture was stirred at 25°C for 2 hours, diluted with about 75 ml. methylene dichloride, washed with water, dried over magnesium sulfate and evaporated under reduced pressure to give a yellow oil The oil was chromatographed on silica gel (hexane/diethyl ether eluants) to give the product as an oil. The elemental analysis on the product is tabulated in Table I.

EXAMPLE 4—
N-Butylthio-N-methyl-m-sec-butylphenyl carbamate

A solution of butylsulfenyl chloride was added dropwise to a solution to 10.5 g. N-methyl-m-sec-butylphenyl carbamate, 12.0 g. pyridine, 10 drops triethylphosphate, several crystals of 2,6-di-tert-butyl-4-methylphenol, and 75 ml. methylene dichloride at about 0°–10°C. The reaction mixture was stirred at about 25°C for 0.5 hour, diluted with about 125 ml. hexane, washed with water, dried over magnesium sulfate and evaporated under reduced pressure to give a yellow oil. The oil was chromatographed on silica gel (hexane/diethyl ether eluants) to give the product. The elemental analysis on the product is tabulated in Table I.

EXAMPLE 5—
N-Propylthio-N-methyl-1-naphthyl carbamate

A solution of 9.9 g. propylsulfenyl chloride was added dropwise to a mixture of 10.6 g. N-methyl-1-naphthyl carbamate, 15 drops nitrobenzene, 12.5 g. pyridine and 100 ml. methylene dichloride at about 25°C. The reaction mixture was stirred at about 25°C for 0.5 hour, diluted with about 100 ml. methylene dichloride, washed with water, dried over magnesium sulfate and evaporated under reduced pressure to give an orange oil. The oil was chromatographed on silica gel (hexane/diethyl ether eluants) to give the product (7.5 g.) as an oil. The elemental analysis is tabulated in Table I.

EXAMPLE 5a —
N-Propylthio-N-methyl-o-sec-butylphenyl carbamate

A 10 g. (0.09 mol) sample of propylsulfenyl chloride was added dropwise to a mixture of 11.1 g. (0.0535 mol) N-methyl-o-sec-butylphenyl carbamate, 10.6 g. (0.133 mol) pyridine, 10 drops nitrobenzene, several crystals of 2,6-di-tert-butyl-4-methylphenol, 5 drops triethyl phosphate, and 100 ml. methylene dichloride at ambient temperature (about 25°C). The reaction mixture was heated at reflux for one-half hour and allowed to cool. The reaction mixture was then diluted with 200 ml. hexane, washed with water, dried over magnesium sulfate and evaporated under reduced pressure. The residue was chromatographed on silica (hexane/diethyl ether eluants) to give the product as a red oil. Elemental analysis on the product is tabulated in Table I.

TABLE I

| No. | Compound | Sulfur Elemental Analysis | |
|---|---|---|---|
| | | Calc. | Found |
| 1 | N-methylthio-N-methyl-1-naphthyl carbamate | 13.0 | 12.7 |
| 2 | N-methylthio-N-methyl-m-sec-butylphenyl carbamate | 12.7 | 10.6 |
| 3 | N-methylthio-N-methyl-m-2-pentylphenyl carbamate | 12.0 | 10.7 |
| 4 | N-methylthio-N-methyl-2,4-dichlorophenyl carbamate | 12.1 | 11.2 |
| 5 | N-ethylthio-N-methyl-m-sec-butylphenyl carbamate | 12.0 | 11.3 |
| 6 | N-ethylthio-N-methyl-m-2-pentylphenyl carbamate | 11.4 | 13.1 |
| 7 | N-methylthio-N-methyl-2,5-dimethylphenyl carbamate | 14.3 | 13.4 |
| 8 | N-methylthio-N-methyl-p-sec-butylphenyl carbamate | 12.7 | 11.8 |
| 9 | N-ethylthio-N-methyl-2,5-dimethylphenyl carbamate | 13.4 | 14.6 |
| 10 | N-ethylthio-N-methyl-1-napthyl carbamate | 12.3 | 12.7 |

TABLE I-Continued

| No. | Compound | Sulfur Elemental Analysis Calc. | Found |
|---|---|---|---|
| 11 | N-ethylthio-N-methyl-m-tert-butylphenyl carbamate | 12.0 | 12.8 |
| 12 | N-butylthio-N-methyl-1-naphthyl carbamate | 11.1 | 12.7 |
| 13 | N-butylthio-N-methyl-m-sec-butylphenyl carbamate | 10.9 | 11.5 |
| 14 | N-ethylthio-N-methyl-2-bromo-4-methylthio-6-methyl-phenyl carbamate | 9.1 | 11.7 |
| 15 | N-butylthio-N-methyl-m-2-pentylphenyl carbamate | 10.4 | 11.9 |
| 16 | N-butylthio-N-methyl-m-tert-butylphenyl carbamate | 10.9 | 11.7 |
| 17 | N-butylthio-N-methyl-p-methylthiophenyl carbamate | 22.5 | 22.3 |
| 18 | N-ethylthio-N-methyl-p-methylthiophenyl carbamate | 25.0 | 24.5 |
| 19 | N-2-ethylhexylthio-N-methyl-m-sec-butylphenyl carbamate | 9.1 | 11.7 |
| 20 | N-methylthio-N-methyl-M-tert-butylphenyl carbamate | 12.7 | 12.3 |
| 21 | N-isopropylthio-N-methyl-m-tert-butylphenyl carbamate | 11.4 | 12.0 |
| 22 | N-isopropylthio-N-methyl-m-sec-butylphenyl carbamate | 11.4 | 12.6 |
| 23 | N-propylthio-N-methyl-m-sec-butylphenyl carbamate | 11.4 | 11.5 |
| 24 | N-propylthio-N-methyl-m-2-pentylphenyl carbamate | 10.9 | 11.0 |
| 25 | N-propylthio-N-methyl-m-tert-butylphenyl carbamate | 11.4 | 12.9 |
| 26 | N-butylthio-N-methyl-m-sec-butyl carbamate | 10.9 | 11.8 |
| 27 | N-propylthio-N-methyl-1-naphthyl carbamate | 11.6 | 10.8 |
| 28 | N-propylthio-N-methyl-o-sec-butylphenyl carbamate | 11.4 | 11.22 |

UTILITY

Carbamates of this invention may be used to control insects such as aphids, cockroaches, cabbage loopers, dock beetles, mosquitoes and the like. Insecticidal quantities of one or more of the carbamates are applied directly to the insect or their habitat for such control. In many instances the carbamates of this invention exhibit significantly better insecticidal activity than the carbamates from which they were derived.

Representative carbamates of this invention were tested as follows to illustrate the insecticidal properties of this grouping. Test results are provided in Table II.

TEST PROCEDURES

APHIDS (APHIS GOSSYPII GLOVER)

An acetone solution of the candidate toxicant and a small amount of nonionic emulsifier was prepared. Cucumber leaves infested with the aphids were dipped into the toxicant solution. Mortality readings were then taken after 24 hours.

AMERICAN COCKROACH (PERIPLANETA AMERICANA L.)

An acetone solution of the candidate toxicant was placed in a microsprayer (atomizer). A random mixture of anesthetized male and female cockroaches was placed in a container and 55 mg. of the above-described acetone solution was sprayed on them. A lid was placed on the container. A mortality reading was made after 24 hours.

CABBAGE LOOPER (TRICHOPLUSIA NI)

An acetone solution of the candidate toxicant containing a small amount of nonionic emulsifier was diluted with water to a known concentration. Cabbage leaf sections were then dipped in the toxicant solution and dried. The leaf sections were then infested with cabbage looper larvae. Mortality readings were taken after 24 hours.

In an alternative procedure, the toxicant compound was dissolved in a suitable organic solvent and then diluted in water such that a 2.5 microliter dose gave 1250 mg. per insect. A random mixture of male and female cockroaches was anesthetized with $CO_2$ and 3 replicates of 10 roaches each were sorted out and placed in corrugated cardboard trays. A 2.5 microliter dose of the toxicant compound mixture was applied to the abdomen of each cockroach with a micrometer syringe. Each replicate was placed in a recovery cage. After 24 hours mortality counts were made on each replicate and a percent mortality based on the average of these counts was made. The first three compounds tabulated in Table II were tested by this procedure.

TABLE II

| Compound No. | % Insect Mortality | | |
|---|---|---|---|
| | Aphids | Cockroach | Cabbage Looper |
| 1 | 100 (30 ppm) | 96 (1250 ng) | — |
| 2 | 10 (30 ppm) | 100 (1250 ng) | — |
| 3 | 22 (30 ppm) | 100 (1250 ng) | — |
| 4 | — | 96 (500 ppm) | — |
| 5 | 22 (30 ppm) | 100 (250 ppm) | 100 (200 ppm) |
| 6 | — | 97 (100 ppm) | 85 (500 ppm) |
| 7 | — | 50 (500 ppm) | 100 (500 ppm) |
| 8 | — | 100 (250 ppm) | — |
| 9 | — | — | 40 (500 ppm) |
| 10 | 99 (40 ppm) | 100 (250 ppm) | 50 (500 ppm) |
| 11 | — | — | 95 (200 ppm) |
| 12 | 100 ( 4 ppm) | 100 ( 30 ppm) | 100 (500 ppm) |
| 13 | 22 (40 ppm) | 100 (100 ppm) | — |
| 14 | 90 (40 ppm) | — | — |
| 15 | 15 (40 ppm) | 99 (500 ppm) | 20 (500 ppm) |
| 16 | — | — | 90 (500 ppm) |
| 17 | — | 30 (500 ppm) | — |
| 18 | — | 39 (500 ppm) | — |
| 19 | 100 ( 4 ppm) | 60 (500 ppm) | 90 (500 ppm) |
| 20 | 22 (40 ppm) | 100 (500 ppm) | 100 (500 ppm) |
| 21 | 22 (40 ppm) | 97 (250 ppm) | 100 (500 ppm) |
| 22 | 100 (10 ppm) | 100 ( 40 ppm) | 90 ( 32 ppm) |
| 23 | 60 (40 ppm) | 100 (100 ppm) | 100 (200 ppm) |
| 24 | — | 100 (250 ppm) | 100 (500 ppm) |
| 26 | 22 (40 ppm) | 100 (100 ppm) | 95 (200 ppm) |
| 27 | 96 ( 4 ppm) | 97 (250 ppm) | 40 (400 ppm) |
| 28 | 22 (40 ppm) | 95 (250 ppm) | 58 (500 ppm) |

EXAMPLE 6

The acute toxicity of several sulfenylated N-methyl-m-2-pentylphenyl carbamates was determined by feeding the carbamate in corn oil to white rats. The carbamate employed and the $LD_{50}$ (rats) are tabulated below.

| Carbamate | $LD_{50}$(rats) mg/kg |
|---|---|
| N-methylthio-N-methyl-m-2-pentylphenyl carbamate | 100 |
| N-ethylthio-N-methyl-m-2-pentylphenyl carbamate | 250 |
| N-methyl-m-2-pentylphenyl carbamate (comparison) | 58 |

EXAMPLE 7

The acute toxicity of several sulfenylated N-methyl-m-sec-butylphenyl carbamates was determined by feeding the carbamate in corn oil to white rats. The carbamate employed and the $LD_{50}$ (rats) are tabulated below.

Compound

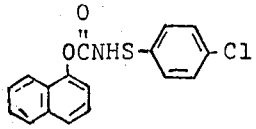

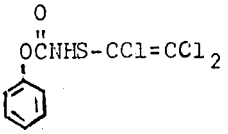

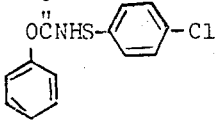

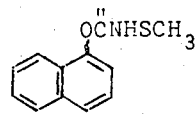

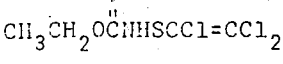

| Carbamate | $LD_{50}$ (rats) mg/kg |
|---|---|
| N-methylthio-N-methyl-m-sec-butyl carbamate | 250 |
| N-ethylthio-N-methyl-m-sec-butyl carbamate | 45 |
| N-butylthio-N-methyl-m-sec-butyl carbamate | 125 |
| N-methyl-m-sec-butylphenyl carbamate (comparison) | 10 |

EXAMPLE 8

Several carbamates were tested for cotton aphid (*Aphis gossypii* Glover) control by the following procedure.

An acetone solution of the candidate carbamate containing a small amount of nonionic emulsifier was diluted with water to give solutions of 30 ppm, 10 ppm and 4 ppm of the carbamate. Cucumber leaves infested with cotton aphids were dipped in the solution. Mortality readings were then taken after 24 hours. The results are tabulated in Table III.

TABLE III

| Compound | % Mortality |
|---|---|
| N-butylthio-N-methyl-1-naphthyl carbamate | 100 ( 4 ppm) |
| N-ethylthio-N-methyl-1-naphthyl carbamate | 97 ( 4 ppm) |
| N-methyl-1-naphthyl carbamate | 0 ( 4 ppm) |
|  | 64 (10 ppm) |
| N-1,1,2,2-tetrachloroethylthio-N-methyl-1-naphthyl carbamate | 0 (30 ppm) |
| N-trichlorovinylthio-N-methyl-1-naphthyl carbamate | 94 (30 ppm) |

EXAMPLE 9

Several sulfenylated aryl carbamates wherein the carbamate nitrogen contains one hydrogen substituent were tested for the control of aphids, cockroaches and cabbage looper by the test procedures previously described. The results are tabulated in Table IV.

TABLE IV

| | % Mortality | |
|---|---|---|
| Aphid | Cockroach | Cabbage Looper |
| 0 (30 ppm) | 0 (500 ppm) | 0 (500 ppm) |
| 0 (30 ppm) | 0 (1250 ng) | 0 (500 ppm) |
| 0 (30 ppm) | 2 (500 ppm) | 0 (500 ppm) |
| 0 (40 ppm) | 0 (500 ppm) | 0 (500 ppm) |
| 0 (30 ppm) | 0 (500 ppm) | 0 (500 ppm) |

The carbamates of this invention are also effective for the control of insects such as Milkweed bug (*Oncopeltus fasciatus* Dallas), dock beetle (*Gastrophysa cyanea* Melsh), German cockroach (*Blattella germanica* L.), salt-marsh caterpillar (*Estigmena acrea*), yellow fever mosquito (*Aedes aegypti*), Alfalfa weevil (*Hypera postica* Gyllenhal), cotton bollworm (*Heliothis zea*) and earwig (*Forficula auricularia* L.).

In addition to the specific formulations and application techniques described above, one or more of the carbamates of this invention may be applied in other liquid or solid formulations to the insects, their environment or hosts susceptible to insect attack. For example, they may be sprayed or otherwise applied directly to the plants or soil so as to effect control of insects coming into contact therewith.

Formulations of the compounds of this invention will comprise a toxic amount of one or more carbamates and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, plant growth regulators, fillers, stabilizers, attractants and the like.

The term "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other related classes of arthropods whose members are segmented invertebrates having more or fewer than six legs, such as spiders, mites, ticks, centipedes, worms and the like.

As will be evident to those skilled in the art, various modifications on this invention can be made or followed, in the light of the foregoing disclosure and discussion, without departing from the spirit or scope of the disclosure or from the scope of the following claims.

We claim:

1. A method of controlling insects which comprises contacting said insects or their habitat with an insecticidally effective amount of the compound of the formula

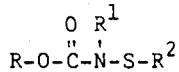

wherein R is phenyl or 1-naphthyl substituted with up to 3 substituents selected from the group consisting of chlorine, bromine, alkyl of 1 to 6 carbon atoms, alkoxy of 1 to 3 carbon atoms and alkylthio of 1 to 3 carbon atoms, $R^1$ is alkyl of 1 to 6 carbon atoms and $R^2$ is alkyl of 1 to 10 carbon atoms.

2. The method of claim 1 wherein $R^1$ is methyl.
3. The method of claim 1 wherein R is 1-naphthyl.
4. The method of claim 3 wherein $R^1$ is methyl and $R^2$ is alkyl of 1 to 4 carbon atoms.
5. The method of claim 4 wherein the compound is N-methyl-N-propylthio-1-naphthyl carbamate.
6. The method of claim 1 wherein R is phenyl substituted with an alkyl of 3 to 6 carbon atoms.
7. The method of claim 6 wherein $R^1$ is methyl and $R^2$ is alkyl of 1 to 4 carbon atoms.
8. The method of claim 7 wherein R is m-sec-butylphenyl.
9. The method of claim 1 wherein the compound is N-methyl-N-ethylthio-m-sec-butylphenyl carbamate.
10. The method of claim 1 wherein the compound is N-methyl-N-butylthio-m-sec-butylphenyl carbamate.
11. The method of claim 1 wherein the compound is N-methyl-N-propylthio-o-sec-butylphenyl carbamate.
12. An insecticidal composition comprising a biologically inert carrier and an insecticidally effective amount of the compound of the formula

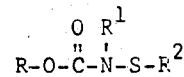

wherein R is phenyl or 1-naphthyl substituted with up to 3 substituents selected from the group consisting of chlorine, bromine, alkyl of 1 to 6 carbon atoms, alkoxy of 1 to 3 carbon atoms and alkylthio of 1 to 3 carbon atoms, $R^1$ is alkyl of 1 to 6 carbon atoms and $R^2$ is alkyl of 1 to 10 carbon atoms.

* * * * *

UNITED STATES PATENT AND TRADEMARK OFFICE
CERTIFICATE OF CORRECTION

PATENT NO. : 3,897,561
DATED : July 29, 1975
INVENTOR(S) : MELANCTHON S. BROWN, deceased, and GUSTAVE K. KOHN It is certified that error appears in the above-identified patent and that said Letters Patent are hereby corrected as shown below:

Title page, [75] Inventors: should read

--Melancthon S. Brown, deceased, late of Berkeley, Calif., by Gustave K. Kohn, special administrator, and Gustave K. Kohn, Berkeley, Calif.--

Signed and Sealed this eighth Day of June 1976

[SEAL]

Attest:

RUTH C. MASON
*Attesting Officer*

C. MARSHALL DANN
*Commissioner of Patents and Trademarks*